US006068399A

United States Patent [19]

Tseng

[11] Patent Number: 6,068,399

[45] Date of Patent: May 30, 2000

[54] COST-EFFECTIVE ELECTRONIC THERMOMETER

[75] Inventor: Chao-Man Tseng, Taipei, Taiwan

[73] Assignee: K-Jump Health Co., Ltd., Taipei, Taiwan

[21] Appl. No.: 08/967,776

[22] Filed: Nov. 12, 1997

[51] Int. Cl.[7] .............................. G01K 7/00; G01K 1/00

[52] U.S. Cl. .......................... 374/163; 374/208; 374/170; 374/183

[58] Field of Search .................................. 374/163, 170, 374/183, 208

[56] References Cited

U.S. PATENT DOCUMENTS

| | | | |
|---|---|---|---|
| D. 287,473 | 12/1986 | Ueno | D10/57 |
| D. 287,829 | 1/1987 | Osaka | D10/57 |
| D. 298,219 | 10/1988 | Muller | D10/57 |
| D. 309,866 | 8/1990 | Fukuda et al. | D10/49 |
| D. 337,533 | 7/1993 | Zaragoza | D10/57 |
| 2,321,846 | 6/1943 | Obermaier | 374/208 |
| 3,822,598 | 7/1974 | Brothers et al. | 73/262 AR |
| 4,128,007 | 12/1978 | Ulin | 73/352 |
| 4,174,631 | 11/1979 | Hammerslag | 73/359 |
| 4,183,248 | 1/1980 | West | 73/362 AR |
| 4,444,517 | 4/1984 | Murase | 374/188 |
| 4,447,884 | 5/1984 | Wada | 374/170 |
| 4,565,456 | 1/1986 | Iida et al. | 374/170 |
| 4,572,213 | 2/1986 | Kawahara | 128/736 |
| 4,688,949 | 8/1987 | Hatakenaka | 374/183 |
| 4,729,672 | 3/1988 | Takagi . | |
| 4,743,121 | 5/1988 | Takagi et al. | 374/163 |
| 4,762,429 | 8/1988 | Fujikawa et al. | 374/163 |
| 4,813,790 | 3/1989 | Frankel et al. | 374/208 |
| 5,013,161 | 5/1991 | Zaragoza et al. | 374/208 |
| 5,133,606 | 7/1992 | Zaragoza et al. | 374/208 |
| 5,165,798 | 11/1992 | Watanabe | 374/208 |
| 5,401,100 | 3/1995 | Thackston et al. | 374/208 |
| 5,575,563 | 11/1996 | Chiu et al. | 374/141 |

FOREIGN PATENT DOCUMENTS

| | | | |
|---|---|---|---|
| 61-144536 | 7/1986 | Japan | 374/208 |
| 2-262025 | 10/1990 | Japan | 374/208 |

*Primary Examiner*—Randy W. Gibson
*Attorney, Agent, or Firm*—Olson & Hierl, Ltd.

[57] ABSTRACT

A cost-effective electronic thermometer comprises a rigid case attached to a flexible probe stem in a lap joint. The flexible probe extends away from the case in a taper of both width and thickness. A sensor with sensor cap are mounted a the distal end of the probe stem. The temperature sensor is connected to an electronic processor with display that is positioned within case and powered by a battery.

15 Claims, 4 Drawing Sheets

16 53 40 38 50 46 12 22 49 50 17 42 48

COST-EFFECTIVE ELECTRONIC THERMOMETER

TECHNICAL FIELD OF THE INVENTION

The present invention relates to an electronic thermometer for detecting and digitally displaying a body temperature. More particularly, the present invention pertains to a cost-effective electronic thermometer with a flexible probe.

BACKGROUND OF THE INVENTION

Hand held electronic thermometers offer many advantages over glass-tube mercury thermometers. In the basic electronic thermometer design, a temperature sensing element is connected to a combined, battery-powered computing and display element. These components are housed in a rigid plastic case having a probe with handle shape. The temperature sensing element is mounted at the end of the probe section and covered with a metal cap. The computing and display element as well as the battery are secured in the handle section of the rigid case, where a viewing window is provided for the temperature display and an access door is provided for the battery. The components are interconnected by wires or leads.

Although such thermometers have enjoyed wide-spread commercial acceptance since the 1970s, efforts at improvement on this basic design continued. To date, numerous advancements have been made. These advancements include mouth-friendly flexible probes, fast-response sensing elements, and audible signaling.

Concerning improvements in probe flexibility for example, U.S. Pat. No. Des. 254,189 to Prosky illustrates a relatively early design of an electronic thermometer with a flexible probe. Giving a somewhat later design, U.S. Pat. No. 5,165,798 to Watanabe also depicts a hand-held electronic thermometer with a flexible probe.

Efforts at improving measurement response times are reflected in U.S. Pat. No. 4,688,949 to Hatakenaka. This patent is directed to a customized multi-layer temperature sensor designed for use in a hand-held thermometer. Infrared-based thermometers having ear probes have also been developed in an effort to further reduce response time. See for example, U.S. Pat. No. 4,993,424 to Suszynski et al.

While offering desirable features, these "improved" thermometers all suffer at least one serious drawback: they are very expensive to fabricate.

The flexible-probe feature, in particular, adds greatly to the costs of production. As U.S. Pat. No. 5,165,798 to Watanabe well demonstrates, the conventional flexible design is multi-piece and multi-layer, requiring a flexible tube mounted to a rigid case with an elastomeric cover surrounding the tube and cover.

So far, faster response times have also come only at greater expense in production. One of many available examples, the fabrication process described for the fast-response probes of U.S. Pat. No. 4,688,949 to Hatakenaka is a multi-step recipe including multiple high temperature baking steps and a laser trimming step. And while said to be fast in their response, the infrared ear probe thermometers are well known to be not only more expensive to make but also less accurate.

To be commercially successful, medical devices designed for the price-sensitive consumer market must be advanced in features but still inexpensive to fabricate. Accordingly it would be desirable to provide an improved hand-held electronic thermometer having a cost-effective design.

Specifically, it would be desirable to provide the advantages of the more-expensive flexible probe and fast-response designs without the excessive fabrication costs.

SUMMARY OF THE INVENTION

A hand-held electronic thermometer having a one-piece flexible probe and a fast-response temperature sensor system is provided for clinical use. Its innovative and elegant design allows for such advanced features at reduced cost.

Specifically, this device includes a flexible monolithic probe stem attached by a lap joint to the distal end of a rigid case. Extending away from the case, the flexible probe stem is tapered outwardly in both width and thickness. A temperature sensor is positioned within a sensor cap mounted at the distal end of the probe stem such that the temperature sensor and sensor cap are in thermal communication.

The temperature sensor is operably associated with an electronic processor, which is in turn operably associated with a digital display and an energizing power source. The electronic processor, the digital display, and the power source are positioned within the rigid case.

The digital thermometer is configured for quick assembly. The rigid case optionally includes top and bottom sections joined across an O-ring seal that is unitary with the probe stem. Furthermore, the temperature sensor may be attached to an isolated region of the sensor cap to reduce measurement response time.

DESCRIPTION OF PREFERRED EMBODIMENTS

Figure 1:
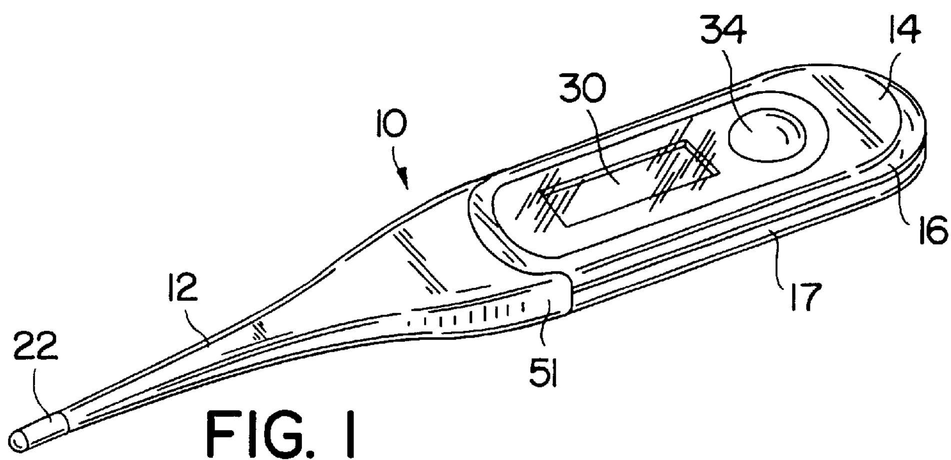
FIG. 1 is a perspective view of an electronic thermometer embodying the features of the present invention.
Figure 2:
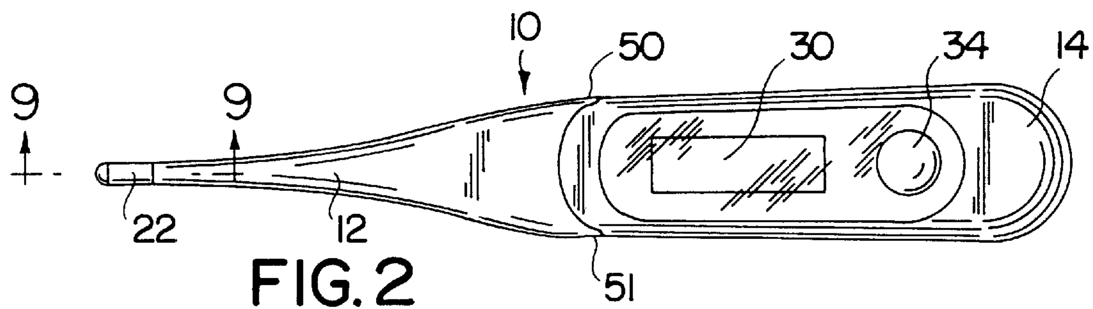
FIG. 2 is a top plan view of the thermometer of FIG. 1.
Figure 3:
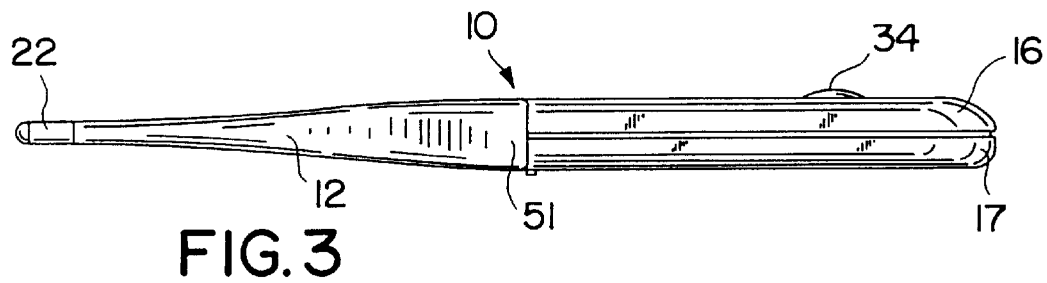
FIG. 3 is a side elevation view of the thermometer of FIG. 1.
Figure 4:
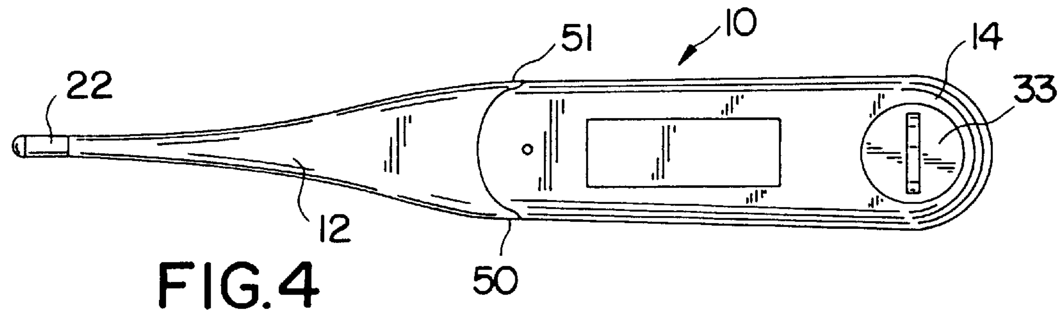
FIG. 4 is a bottom elevation view of the thermometer of FIG. 1.

While this invention is satisfied by embodiments in many different forms, there is shown in the drawings and will be described herein in detail specific embodiments of the invention with the understanding that this disclosure is to be considered a demonstration of the principles of the claimed invention and is not to be limited to the specific embodiments illustrated.

Adverting to FIGS. 1 through 5, an electronic thermometer 10 comprises a probe stem 12 extending outwardly from a case 14. Probe stem 12 is monolithic, flexible and tapered outwardly from case 14 in both width and thickness. Case 14 is substantially rigid and includes a top section 16 and a bottom section 17. A lap joint 18 links probe stem 12 to case 14 and forms an interlocking water-tight seal.

Electronic thermometer 10 also includes a temperature sensor 20 in the form of a temperature-responsive element such as a thermistor or thermocouple. Temperature sensor 20 converts ambient temperature into an electronic signal. A sensor cap 22 mounted at the distal end of probe stem 12 surrounds and protects temperature sensor 20. Sensor cap 22 is made from a thermally conductive material such as stainless steel, aluminum or the like. Temperature sensor 20 attaches to sensor cap 22 such that these elements are in thermal communication. Although optional, a thermally conductive adhesive material 23 (or potting compound) such as a thermally conductive epoxy can be used to attach temperature sensor 20 to sensor cap 22.

Figure 5:
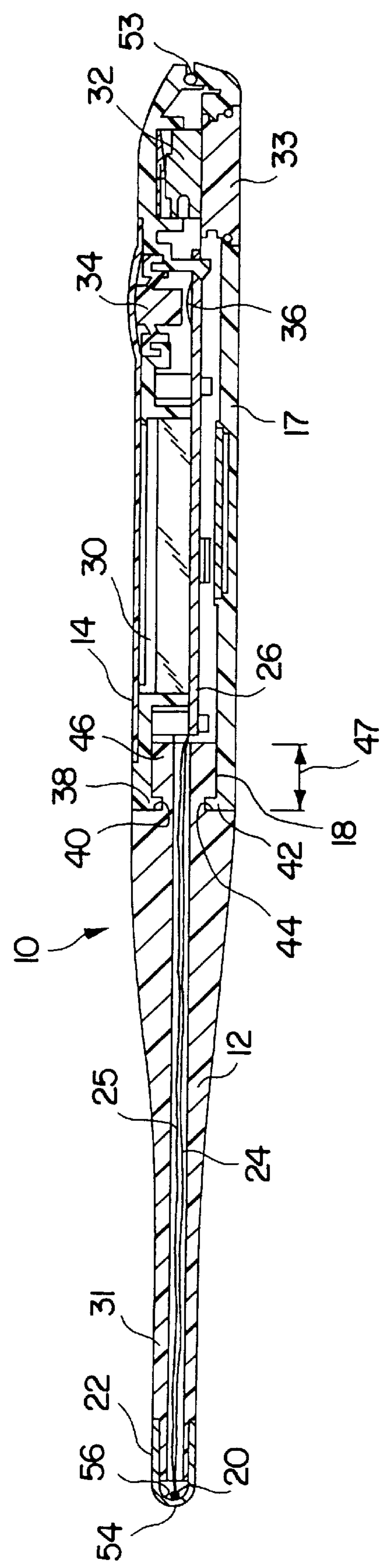
FIG. 5 is an enlarged vertical cross-sectional view of the electronic thermometer of FIG. 1.

Temperature sensor 20 is electrically connected by conductors 24 and 25 to a printed circuit board module 26 that includes, in combination, an electronic processor (dispersed on module 26) operably associated with a digital display 30. As shown in FIG. 5, conductors 24 and 25 extend through an axially extending passageway 31 defined in probe stem 12. Axially extending passageway 31 could also be called a conductor passageway. However, probe stem 12 could also be solid. For example, conductors 24 and 25 could be encased in probe stem 12 without a defined passageway.

Printed circuit board module 26 converts electric signals from temperature sensor 20 into digital signals. The digital display 30 then serves to display a numeric read-out of the temperature detected.

A power source 32, preferably a battery, energizes printed circuit board module 26 and its electronic processor. Removable cover 33 allows access to power source 32. A push-button 34 activates a power switch 36 that is optionally positioned on printed circuit board module 26. Power switch 36 controls electrical connection between power source 32 and the electronic processor.

A key feature of the present invention is that the probe stem is one piece (i.e. monolithic). Because of this, electronic thermometers of the present invention are easier and less expensive to assemble than thermometers heretofore available.

The present monolithic design is accomplished without compromises in either structural integrity or seal quality. As shown in FIGS. 5 through 8, probe stem 12 and case 14 are joined by lap joint 18. Lap joint 18 is formed by opposing flanges that extend inwardly at the distal end of case 14, and corresponding mating grooves positioned toward the proximal end of probe stem 12. Specifically, top section 16 of case 14 has a top flange 38 nested in an upper mating groove 40 of probe stem 12, while lower section 17 has a bottom flange 42 nested in lower mating groove 44.

An overlap portion 46 of probe stem 12 extends into case 14 an overlap span 47. Overlap span 47 is preferably at least about 0.1 centimeters, and most preferably at least about 0.4 centimeters.

Figure 6:
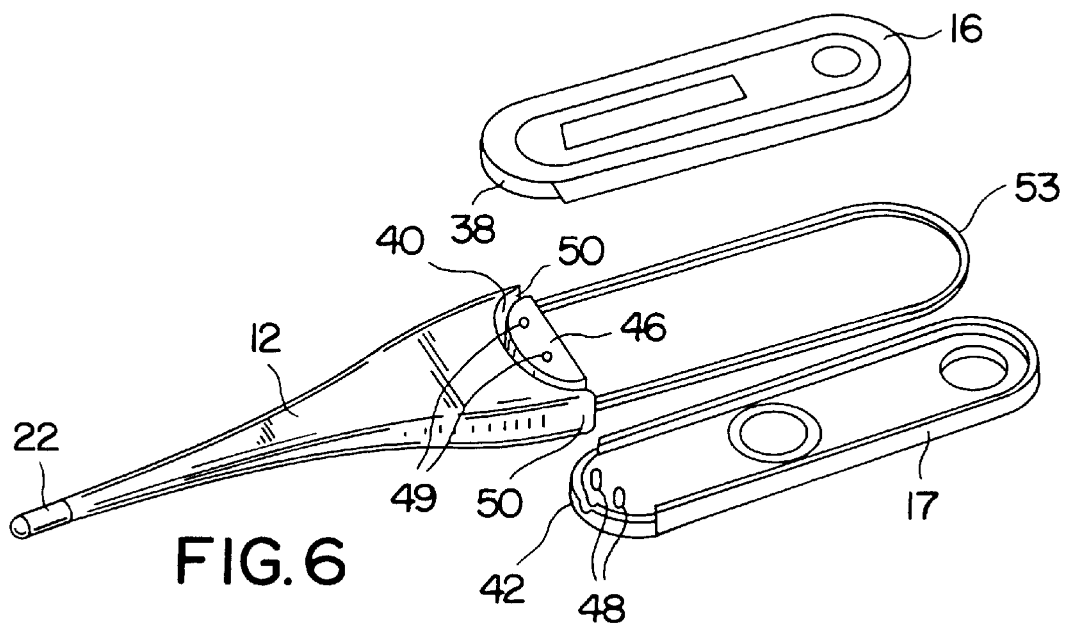
FIG. 6 is an exploded perspective view of the thermometer of FIG. 1 shown without internal components.

As best shown in FIG. 6, flanges 38 and 42 and their corresponding mating grooves 40 and 44 are preferably arcuate, and more preferably have substantially the same radius of curvature as the flange that nest therewithin. While distinct upper and lower mating grooves are shown in the FIGURES, the same function could be accomplished by a continuous mating groove that extends peripherally about the probe stem. Optional connecting pins 48 and corresponding sockets 49 enhance interconnection. Side flaps 50 and 51 of probe stem 12 are also optional, but preferred for enhanced interconnection.

Figure 7:
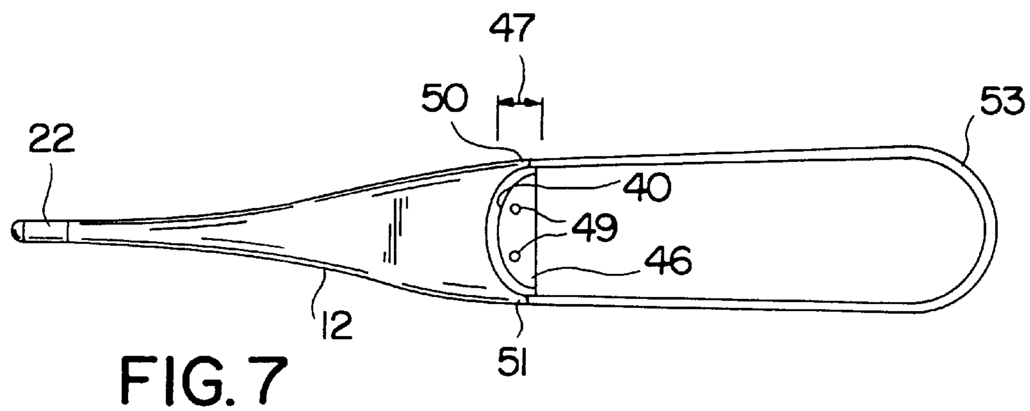
FIG. 7 is a top plan view of a probe stem and O-ring according to the present invention.
Figure 8:
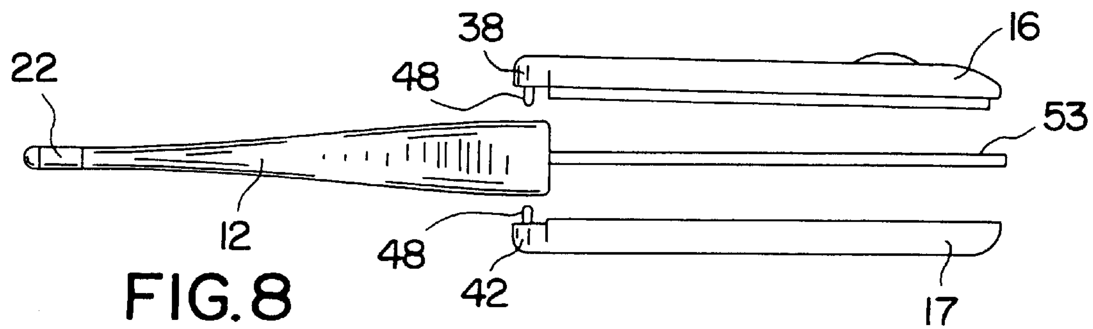
FIG. 8 is an exploded side view of the thermometer of FIG. 1.

In one preferred embodiment of the present invention, an O-ring seal 53 is unitary with probe stem 12 and positioned between top section 16 and bottom section 17 of case 14, as shown in FIGS. 6 through 8. The integrally formed O-ring seal not only provides a low-cost seal but also provides a water-resistant seal and serves to enhance the interconnection between stem 12 and case 14. Specifically, the O-ring seal together with connecting pins further secure the side portions of probe stem 12 (and its optional flaps) to case 14 so as to minimize likelihood of dislodgment.

Figure 9:
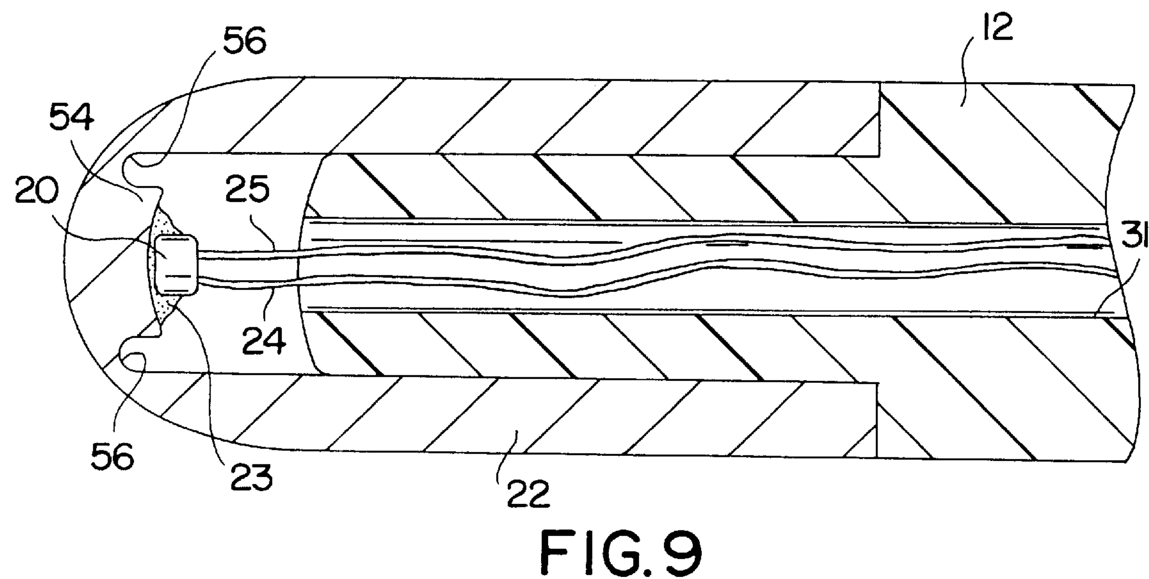
FIG. 9 is an enlarged partial cross sectional view taken along the plane 9—9 in FIG. 2.

Another key feature of the present invention is a reduced heat capacity temperature sensor system. Referring now to FIG. 9, sensor cap 22 includes a thermally isolated region 54 delineated by a groove 56 from the inside surface of sensor cap 22 and defined by a region of reduced cross-sectional area. Temperature sensor 20 is positioned within sensor cap 22 such that temperature sensor 20 is in thermal-communication with thermally substantially isolated region 54 while also at least partially insulated from other portions of sensor cap 20. In other words, sensor cap 22 has a sensor attachment region that is substantially thermally isolated from other portions of the sensor cap and affords a more rapid response.

The thermally isolated region has a substantially lower overall heat capacity than the full sensor cap. Therefore, the temperature of the temperature sensor can more quickly rise to equilibrium with a patients body temperature. Unlike conventional designs for faster response, the present design allows for a fast-response measurement without significantly increasing production cost.

Figure 10:
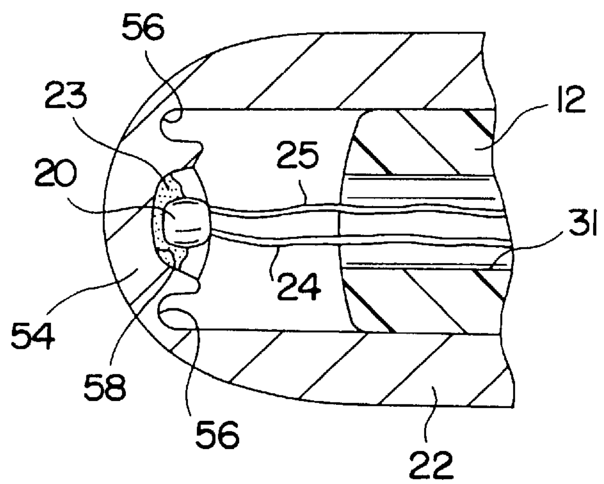
FIG. 10 is an enlarged partial cross sectional view of an assembled temperature sensor with sensor cap according to an alternate embodiment of the present invention.

As noted above, a thermally conductive adhesive (or potting compound) 23 may be used to better secure sensor 20 to region 54. As shown in FIG. 10, attachment can be enhanced by providing a thermally conductive potting compound 23 in region 54 for potting temperature sensor within a cavity 58. This approach carries the added advantage of further reducing overall heat capacity for temperature sensor 20.

A wide variety of materials are suitable for making thermometers of the present invention. These materials include various plastics without limitation that all of the structural elements be made of the same material. Injection molded plastics are generally preferred. The flexible probe stem can be made of a soft or pliant plastic. Suitable materials include natural rubber, synthetic rubber, thermoplastics such elastomers, and thermosets such as resilient foam.

Numerous variations and modifications of the embodiments described above may be effected without departing from the spirit and scope of the novel features of the invention. It is to be understood that no limitations with respect to the specific system illustrated herein are intended or should be inferred. It is, of course, intended to cover by the appended claims all such modifications as fall within the scope of the claims.

I claim:

1. A clinical thermometer comprising:

a rigid case;

a monolithic flexible probe stem attached to the distal end of said case by a lap joint and extending away from said case; said probe stem having a width and thickness both tapered outwardly away from said probe stem;

a sensor cap mounted to the distal end of said probe stem;

a temperature sensor positioned within said sensor cap and in thermal communication with said sensor cap;

a digital display in said case;

an electronic processor in said case operably associated with said temperature sensor and with said digital display to convert a temperature value detected by said temperature sensor into a read-out on said digital display; and a power source operably associated with said processor for energizing the processor.

2. The thermometer in accordance with claim 1 wherein said lap joint is formed by an inwardly extending arcuate flange at the distal end of said case and unitary therewith, and a mating groove in said probe stem within which the flange nests.

3. The thermometer in accordance with claim 2 wherein a portion of said probe stem extends into said case at least about 0.1 centimeters.

4. The thermometer in accordance with claim 2 wherein said mating groove is at least about 0.1 centimeters from the proximal end of said probe stem.

5. The thermometer in accordance with claim 2 wherein said mating groove has substantially the same radius of curvature as said flange.

6. The thermometer in accordance with claim 2 wherein said mating groove extends peripherally about said probe stem.

7. The thermometer in accordance with claim 1 wherein said case has a top section and bottom section and an O-ring seal therebetween, said O-ring seal being unitary with said probe stem and extending away from said probe stem toward said rigid case.

8. The thermometer in accordance with claim 1 wherein said sensor cap has a thermally isolated region attached to said temperature sensor.

9. A clinical thermometer comprising:

a rigid case;

a monolithic flexible probe stem attached to the distal end of said case by a lap joint and extending away from said case; said probe stem having a width and thickness both tapered outwardly away from said probe stem;

a sensor cap mounted to the distal end of said probe stem and having a thermally isolated region delineated by a groove in said sensor cap and defined by a region of reduced cross-sectional area;

a temperature sensor positioned within said sensor cap and in thermal communication with said sensor cap, said thermally isolated region being attached to said sensor;

a digital display in said case;

an electronic processor in said case operably associated with said temperature sensor and with said digital display to convert a temperature value detected by said temperature sensor into a read-out on said digital display; and a power source operably associated with said processor for energizing the processor.

10. The thermometer in accordance with claim 1 wherein said temperature sensor is attached to a thermally isolated region of said sensor cap.

11. A clinical thermometer comprising:

a rigid case;

a monolithic flexible probe stem attached to the distal end of said case by a lap joint and extending away from said case; said probe stem having a width and thickness both tapered outwardly away from said probe stem;

a sensor cap mounted to the distal end of said probe stem, the sensor cap having an inside surface and a sensor attachment region substantially thermally isolated from other portions of said sensor cap by a groove from said inside surface;

a temperature sensor positioned within said sensor cap and in thermal communication with said sensor cap;

a digital display in said case;

an electronic processor in said case operably associated with said temperature sensor and with said digital display to convert a temperature value detected by said temperature sensor into a read-out on said digital display; and a power source operably associated with said processor for energizing the processor.

12. The thermometer in accordance with claim 1 wherein said electronic processor is operably connected to said temperature sensor by a conductor encased by said probe stem.

13. The thermometer in accordance with claim 12 wherein said conductor is positioned within an axially extending passageway defined by said probe stem.

14. The thermometer in accordance with claim 1 wherein said probe stem defines a conductor passageway for a connecting lead between said temperature sensor and said processor.

15. A clinical thermometer comprising:

a rigid case having a top portion and bottom portion;

a monolithic flexible probe stem attached to the distal end of said case by a lap joint and a retaining O-ring secured between said top section and said bottom section, said probe stem extending away from said case, said retaining O-ring being unitary with the probe stem;

a sensor cap mounted to the distal end of said probe stem;

a temperature sensor positioned within said sensor cap and in thermal communication with said sensor cap;

a digital display in said case;

an electronic processor in said case operably associated with said temperature sensor and with said digital display to convert a temperature value detected by said temperature sensor into a read-out on said digital display; and a power source operably associated with said processor for energizing the processor.

* * * * *